(12) United States Patent
Gao et al.

(10) Patent No.: US 7,011,771 B2
(45) Date of Patent: Mar. 14, 2006

(54) METHOD OF MAKING CARBON NANOTUBES ON A SUBSTRATE

(75) Inventors: Yufei Gao, Kennewick, WA (US); Jun Liu, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 934 days.

(21) Appl. No.: 09/996,523

(22) Filed: Nov. 28, 2001

(65) Prior Publication Data

US 2002/0055010 A1 May 9, 2002

Related U.S. Application Data

(62) Division of application No. 09/333,876, filed on Jun. 14, 1999, now Pat. No. 6,361,861.

(51) Int. Cl.
| | |
|---|---|
| *H01J 9/02* | (2006.01) |
| *H01J 1/30* | (2006.01) |
| *D01F 9/12* | (2006.01) |
| *C23C 26/00* | (2006.01) |

(52) U.S. Cl. ............ 252/502; 252/504; 423/445; 423/447; 423/414; 427/367; 427/590; 427/903; 428/367; 313/311

(58) Field of Classification Search ............ 252/502, 252/504, 301.4 R; 427/367, 903, 590; 423/445, 423/447, 414; 428/367; 313/311; 445/24, 445/50

See application file for complete search history.

(56) References Cited

U.S. PATENT DOCUMENTS 5,916,642 A * 6/1999 Chang ............ 29/509
6,146,227 A * 11/2000 Mancevski ............ 445/24

OTHER PUBLICATIONS

Zhang et al, "Coaxial Nanocable: Silicon Carbide and Silicon Oxide Sheathed with Boron Nitride and Carbon," Science, 1998, 281(5379), pp 973–975.*

(Continued)

*Primary Examiner*—Mark Kopec
*Assistant Examiner*—Kallambella Vijayakumar
(74) *Attorney, Agent, or Firm*—Douglas E. McKinley, Jr.

(57) ABSTRACT

The present invention includes carbon nanotubes whose hollow cores are 100% filled with conductive filler. The carbon nanotubes are in uniform arrays on a conductive substrate and are well-aligned and can be densely packed. The uniformity of the carbon nanotube arrays is indicated by the uniform length and diameter of the carbon nanotubes, both which vary from nanotube to nanotube on a given array by no more than about 5%. The alignment of the carbon nanotubes is indicated by the perpendicular growth of the nanotubes from the substrates which is achieved in part by the simultaneous growth of the conductive filler within the hollow core of the nanotube and the densely packed growth of the nanotubes. The present invention provides a densely packed carbon nanotube growth where each nanotube is in contact with at least one nearest-neighbor nanotube. The substrate is a conductive substrate coated with a growth catalyst, and the conductive filler can be single crystals of carbide formed by a solid state reaction between the substrate material and the growth catalyst. The present invention further provides a method for making the filled carbon nanotubes on the conductive substrates. The method includes the steps of depositing a growth catalyst onto the conductive substrate as a prepared substrate, creating a vacuum within a vessel which contains the prepared substrate, flowing H2/inert (e.g. Ar) gas within the vessel to increase and maintain the pressure within the vessel, increasing the temperature of the prepared substrate, and changing the H2/Ar gas to ethylene gas such that the ethylene gas flows within the vessel. Additionally, varying the density and separation of the catalyst particles on the conductive substrate can be used to control the diameter of the nanotubes.

15 Claims, 5 Drawing Sheets

OTHER PUBLICATIONS

Dai et al, "Synthesis and Characterization of Carbide Nanorods," Nature, 1995, 375, pp769–772.*

Ren et al, "Synthesis of Large Arrays of Well–Aligned Carbon Nanotubes on Glass," Science, 1998, 282(5391), pp 1105–1107.*

Y. Ahang, et al., "Coaxial Nanocable: Silcon Carbide and Silicon Oxide Sheathed with Boron Nitride and Carbon," Science Magazine, Aug. 14, 1998, pp. 973–975, vol. 281, No. 5379, AAAS.

Z. F. Ren, et al., "Synthesis of Large Arrays of Well–Aligned Carbon Nanotubes on Glass," Science Magazine, Nov. 6, 1998, pp. 1105–1107, vol. 282, No. 5391, AAAS.

W.Z.Li, et al., "Large–Scale Synthesis of Aligned Carbon Nanotubes," Science Magazine, Dec. 6, 1996, pp. 1701–1703, vol. 274, No. 5293, AAAS.

Andreas Thess, et al., "Crystalline Ropes of Metallic Carbon Nanotubes," Science Magazine, Jul. 26, 1996, pp. 483–487, vol. 273, No. 5274, AAAS.

Hongjie Dai, et al., "Synthesis and Characterization of Carbide Nanorods," Nature, Jun. 29, 1995, pp. 769–772, vol. 375.

C. Journet, et al., "Large–scale Production of Single–walled Carbon Nanotubes by the Electric–arc Technique," Nature, Aug. 21, 1997, pp. 756–758, vol. 388.

R. T. K. Baker, "Catalytic Growth of Carbon Filaments," Carbon, 1989, pp. 315–323, vol. 27, No. 3, Pergamon Press, Great Britain.

Walt A. De Heer, et al., "Aligned Carbon Nanotube Fils: Production and Optical and Electronic Properties," Science, May 12, 1995, pp. 845–847, vol. 268.

P. M. Ajayan, et al., "Aligned Carbon Nanotube Arrays Formed by Cutting a Polymer Resin–Nanotube Composite," Science, Aug. 26, 1994, pp. 1212–1214, vol. 265.

* cited by examiner

METHOD OF MAKING CARBON NANOTUBES ON A SUBSTRATE

CROSS REFERENCE TO RELATED APPLICATIONS

This Application is a divisional of U.S. Ser. No. 09/333,876, filed Jun. 14, 1999, now U.S. Pat. No. 6,361,861.

STATEMENT REGARDING FEDERALLY SPONSORED RESEARCH OR DEVELOPMENT

This invention was made with Government support under Contract DE-AC0676RLO1830 awarded by the U.S. Department of Energy. The Government has certain rights in the invention.

FIELD OF THE INVENTION

The present invention relates generally to the synthesis of carbon nanotubes on substrates. More specifically, the invention relates to dense arrays of well-aligned carbon nanotubes filled with conductive filler synthesized on conductive substrates and a method for making these carbon nanotubes.

BACKGROUND OF THE INVENTION

Carbon nanotubes constitute a new class of materials with a broad range of potential applications. Their unique properties make carbon nanotubes ideal candidates for novel application in areas such as vacuum microelectronics, flat panel displays, scanning probes and sensors, field emission devices and nanoelectronics.

A wide range of techniques has been used to prepare carbon nanotubes. For example, carbon nanotubes can now be produced in high yield and with reasonable quality as reported by C. Journet et al., Nature 388, 756 (1997), using arc discharge, by A. Thess et al., Science 273, 483 (1996), using laser ablation, and by R. T. Baker, Carbon 27, 315 (1989), using thermal decomposition of hydrocarbons.

Alignment of carbon nanotubes is particularly important for their use in applications such as flat panel displays. Ajayan et al., Science 265, 1212 (1994) report manufacturing a composite with carbon nanotubes randomly dispersed inside a polymer resin matrix and found that slicing the composite caused partial alignment of the nanotubes on the cut surface. De Heer et al., Science 268, 845 (1995) fabricated partially aligned nanotube films by drawing a nanotube suspension through a micropore filter.

More recently, well-aligned carbon nanotube arrays have been synthesized on solid substrates. W. Z. Li et al., Science 274, 1701 (1996), report well-aligned carbon nanotube arrays synthesized by thermal decomposition of acetylene gas in nitrogen on porous silica containing iron nanoparticles, and Z. F. Ren et al., Science 282, 1105 (1998), report well-aligned carbon nanotube arrays synthesized by hot-filament plasma-enhanced thermal decomposition of acetylene gas on nickel-coated glass. All of these preparations however, result in isolated carbon nanotubes on substrates where all the nanotubes are separated by distances on the order of 100 nanometers within the arrays. Disadvantages of these separations between the carbon nanotubes include decreased nanotube capacity on the substrate and a decreased ability to maintain alignment as the nanotubes grow longer.

Although hollow carbon nanotubes have substantial utility, it is recognized that filling the hollow core of carbon nanotubes with materials having useful physical, chemical, and electronic properties significantly broadens the range of potential applications for carbon nanotubes. Early attempts to fill carbon nanotubes were based on electric arc or laser ablation methods using metal/carbon composites as reported for example by Zhang et al., Science 281, 973 (1998), or on capillary-force infiltration of open-ended nanotubes as reported by Ugarte et al., Science 274, 1897 (1996). In addition, Dia et al., Nature 375, 769 (1995), reported an attempt to fill carbon nanotubes resulting in the reaction of the carbon nanotubes with titanium oxide (TiO) which converted all the nanotubes into titanium carbide (TiC) nanorods. In these and other prior experiments the carbon nanotubes were found to be only partially filled to a level of approximately 10%. The disadvantage of having carbon nanotubes that can only be partially filled is a decrease in the benefit sought to be gained through the useful properties of the materials filling the nanotube cores.

In view of the current and potential applications for carbon nanotubes, there remains a need in carbon nanotube technology for a method of synthesizing dense arrays of well-aligned carbon nanotubes on conductive substrates where the nanotubes are simultaneously and completely filled with conductive materials.

SUMMARY OF THE INVENTION

The present invention includes carbon nanotubes whose hollow cores are 100% filled with conductive filler. The carbon nanotubes are in uniform arrays on a prepared substrate and are well-aligned and can be densely packed. The uniformity of the carbon nanotube arrays is indicated by the uniform length and diameter of the carbon nanotubes, both which vary from nanotube to nanotube on a given array by no more than about 5%. The alignment of the carbon nanotubes is indicated by the perpendicular growth of the nanotubes from the prepared substrate which is achieved in part by the simultaneous growth of the conductive filler within the hollow core of the nanotube and the densely packed growth of the nanotubes. The present invention provides a densely packed carbon nanotube growth where each nanotube is in contact with at least one nearest-neighbor nanotube. The prepared substrate is a conductive substrate coated with a growth catalyst, and the conductive filler can be single crystals of carbide formed by a solid state reaction between the conductive substrate material and the growth catalyst.

The present invention further provides a method for making the filled carbon nanotubes on prepared substrates. The method includes the steps of depositing a growth catalyst onto a conductive substrate to form the prepared substrate, creating a vacuum within a vessel which contains the prepared substrate, flowing H2/inert (e.g. Ar) gas within the vessel to increase and maintain the pressure within the vessel, increasing the temperature of the prepared substrate, and changing the H2/Ar gas to ethylene gas such that the ethylene gas flows within the vessel. Additionally, varying the density and separation of the catalyst particles on the conductive substrate can be used to control the diameter of the nanotubes.

It is an object of the present invention to provide a method for the synthesis of dense arrays of well-aligned carbon nanotubes on prepared substrates where each carbon nanotube is simultaneously and completely filled with a conductive filler.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
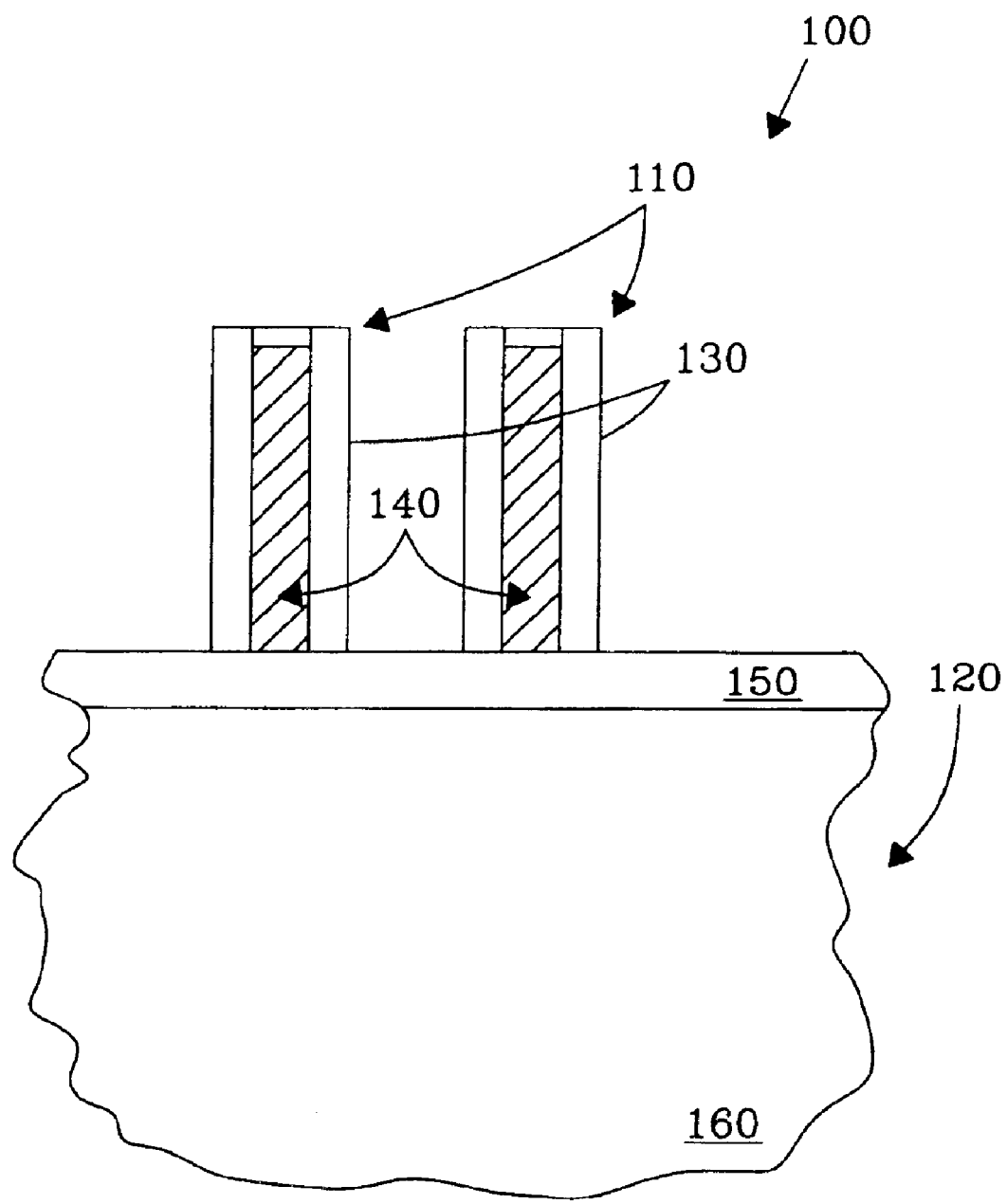
FIG. 1 is an illustration of an array of a plurality of carbon nanotubes.

As shown in FIG. 1, the present invention is an array of a plurality of carbon nanotubes 100 where each carbon nanotube 110 is attached to, and extends from, a prepared substrate 120 and has a closed outer wall 130 defining a hollow core that is simultaneously filled more than 10% with a conductive filler 140 while the carbon nanotube 110 is formed. The present invention further provides a method for making this array of carbon nanotubes which includes the steps of depositing a growth catalyst 150 onto a conductive substrate 160 to form the prepared substrate 120, creating a vacuum within a vessel which contains the prepared substrate, flowing H2/inert (e.g. Ar) gas within the vessel and increasing the pressure within the vessel, increasing the temperature of the prepared substrate, and changing the H2/Ar gas to ethylene gas such that the ethylene gas flows within the vessel.

The arrays of the carbon nanotubes filled with conductive filler are fabricated by first depositing a thin layer of growth catalyst 150 onto the conductive substrate 160. Depositing the growth catalyst is preferably by electron beam evaporation, and preferably results in a thin layer on the conductive substrate which is about 1 to 30 nanometers in thickness. The conductive substrate is an electrically conductive substrate, preferably made of metals including but not limited to transition elements appearing in groups IIIB, IVB, VIB, VIIB, VIII, and IB of the periodic table. Preferred metals are titanium, vanadium, tantalum, and combinations thereof. Non-metals such as carbides may also be used for the conductive substrate, for example, titanium carbide. The growth catalyst is preferably iron, but may also be iron oxide and combinations thereof.

After the conductive substrate is prepared with the growth catalyst coating, the vessel which contains the prepared substrate is evacuated to a first pressure below 2 torr. The vessel is preferably a quartz reactor placed within a tube furnace. The pressure within the vessel is then increased to a second pressure within the range from about 200 torr to about 400 torr by flowing H2/inert (e.g. Ar) gas within the vessel. After the pressure stabilizes within the vessel, the prepared substrate is heated using the tube furnace. Once the prepared substrate temperature reaches the growth temperature, which can range from about 650° C. to about 800° C., but which is preferably from about 700° C. to 775° C., the $H_2$/Ar flow is stopped and ethylene gas, preferably but not necessarily with a purity of about 99.5%, is introduced into the reactor. A preferable introduction flow rate of 200 $cm^3$/min. Typical growth periods range from about 10 minutes to 3 hours.

The heat treatment of the prepared substrate can be controlled to vary the density and separation of catalyst particles on the prepared substrate. A higher heat results in more coalescing of the catalyst particles, and thus, fewer and larger catalyst sites, which results in separation distances between these sites on the prepared substrate. The density of the catalyst sites controls the diameter of the carbon nanotubes with a higher density resulting in a greater diameter carbon nanotube. As the ethylene gas flows, it decomposes as a carbon source and diffuses into the catalyst particles causing precipitation and growth of the carbon nanotubes. At the same time, the conductive substrate material diffuses into the catalyst particles resulting in the growth of a carbide core (conductive filler) within the hollow carbon nanotubes. The carbide core within the carbon nanotubes is a conductive filler preferably made up of carbon and titanium. However, the conductive filler may also be made up of carbon and whichever metal makes up the conductive substrate, which includes but is not limited to transition elements appearing in groups IIIB, IVB, VIB, VIIB, VIII, and IB of the periodic table. Preferred metals are titanium, vanadium, tantalum, and combinations thereof. The hollow core of each carbon nanotube is filled with the conductive filler to a point which is greater than 10% full, but which is preferably greater than 50% full, and which is more preferably greater than 75% full, and which is most preferably about 100% full, where "about 100%" means 100%, plus or minus 5%.

The carbon nanotubes have lengths ranging from about 1 to 2 $\mu$m, varying no more than about 5%, which provides uniform lengths. The carbon nanotubes also have uniform diameters such that their diameters vary no more than about 5%. The outside nanotube diameter ranges from less than 40 to about 400 nm and the inside nanotube diameter ranges from about 10 to about 100 nm. The diameters of the carbon nanotubes and filled cores can be controlled by varying the thickness of the catalyst (iron) layer. In general, the thicker the iron catalyst layer, the bigger the tube diameter. However, when the tube diameter is less than 40 nm, the carbon nanotubes are curved and only partially filled.

EXAMPLE 1

A number of conductive substrates were selected to investigate their effects on the formation of the filled carbon nanotubes. The formation of the filled nanotubes depends on the solubility of the iron (the catalyst) in the conductive substrate and the free energy of formation for the respective carbide phase. The conductive substrate materials selected included tantalum, silicon, and molybdenum. All of these materials can form stable carbides. Carbon nanotubes were deposited on the prepared substrates under the same growth conditions used for growth of carbon nanotubes using titanium conductive substrates. While dense arrays of filled carbon nanotubes were observed on tantalum conductive substrates similar to those shown in FIG. 2a, only curved hollow carbon nanotubes were formed on silicon conductive substrates. No carbon nanotubes were observed on molybdenum conductive substrates. For molybdenum conductive substrates, X-ray photoelectron spectrometry and backscattering electron SEM indicated formation of Fe-Mo solid solutions in the surface region of the prepared substrates. The high solubility of Fe in Mo depleted the catalytic material required to grow the carbon nanotubes. For silicon conductive substrates, the driving force to form SiC is much lower than that for the formation of either TiC or TaC. The free energy of formation of these carbides is on the order of −43 kcal/mol for TiC, −35 kcal/mol for TaC, and −15 kcal/mol for SiC. Although carbon nanotubes are formed on prepared substrates using silicon conductive substrates, the growth rate of SiC is very low compared to that of TiC or TaC, resulting in hollow carbon nanotubes. These tubes tend to be tilted or curved.

Figures 2A, 2B, 2C:
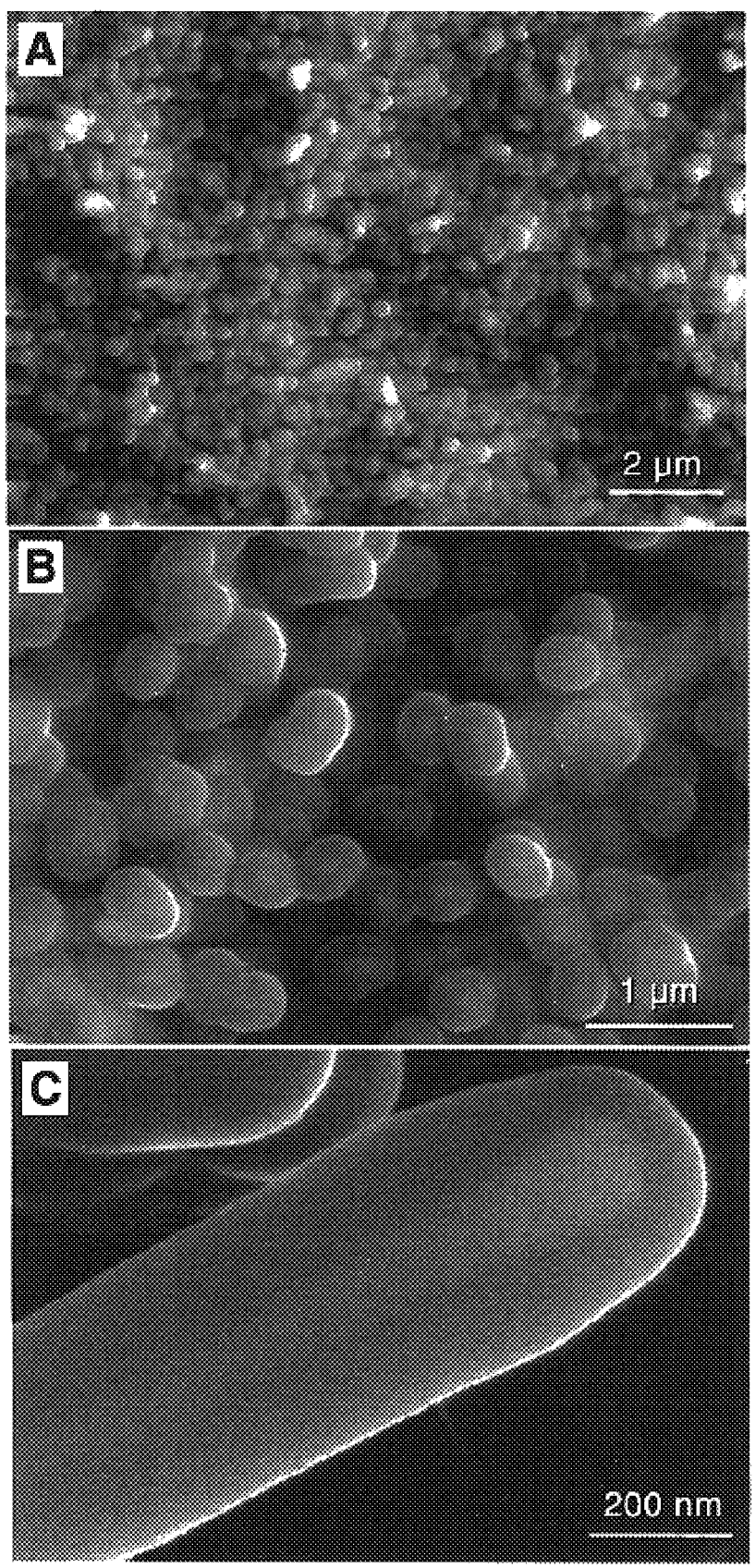
FIG. 2a is a photograph of a scanning electron microscopy micrograph illustrating the dense and well-aligned morphology of the carbon nanotube array.
FIG. 2b is a photograph of a scanning electron microscopy micrograph illustrating the structure of the carbon nanotubes.
FIG. 2c is a photograph of a scanning electron microscopy micrograph illustrating a tilted carbon nanotube revealing the nanowire-like structure of the conductive filler enclosed within.

The carbon nanotubes of the present invention are examined by scanning electron microscopy (SEM) and transmission electron microscopy (TEM). FIG. 2a reveals the dense, well-aligned morphology of the carbon nanotube array. The SEM images were recorded using 70% secondary electron signals and 30% back scattering electron signals. The intensity is therefore proportional to the atomic number of the elements that comprise the material. A magnified SEM image (FIG. 2b) shows that the structure of the carbon nanotubes of the present invention is different from that of oriented carbon nanotubes previously reported. First, the carbon tubes are densely packed, rather than well separated as with prior reported carbon nanotubes. Secondly, the tube tips as shown in FIGS. 2a, 2b, & 2c, appear brighter at the center of the carbon nanotubes, indicating that the cores of the carbon nanotubes are filled with a material having elements of higher atomic number than carbon.

Figure 3A:
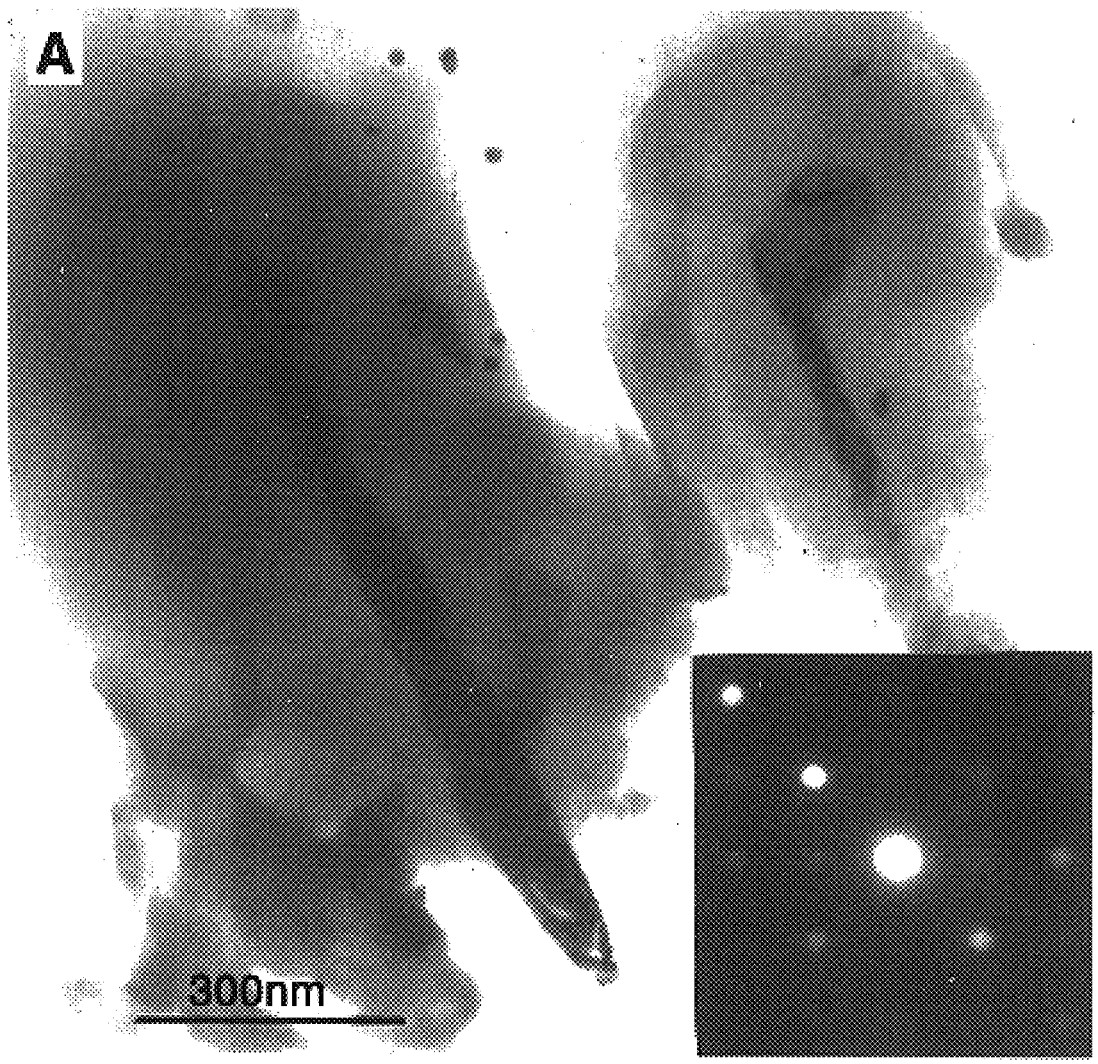
FIG. 3a is a photograph of a cross-sectional transmission electron microscopy illustrating the nature of the conductive fillers filling the core of carbon nanotubes.
Figure 3B:
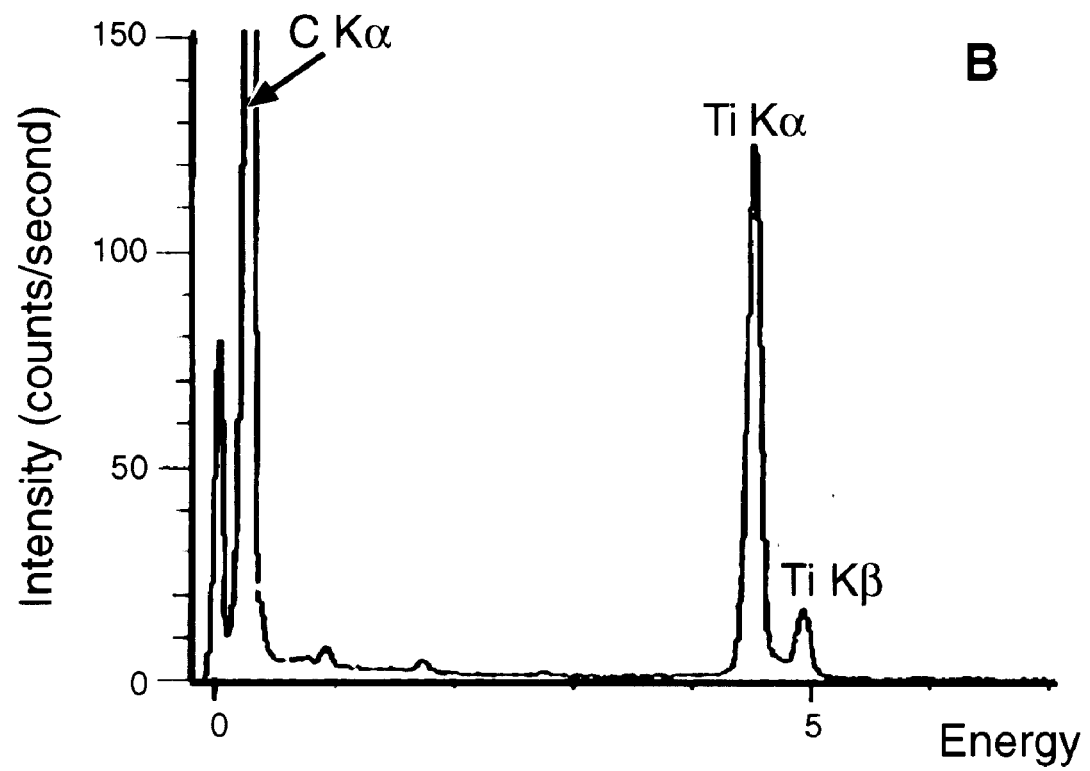
FIG. 3b is an energy-dispersive x-ray spectra illustrating that the core of the conductive filler is comprised of both titanium and carbon.

Most of the carbon nanotubes filled with conductive filler of the present invention in FIG. 2a have similar length and are approximately perpendicular to the prepared substrate surface, although in a few cases the conductive filler is tilted and extended above the surface. A SEM image (FIG. 2c) of a tilted nanotube reveals a structure of conductive filler enclosed by carbon. The filled material has a large head near the tube tip, and its diameter is about one quarter of the carbon nanotube diameter. Further evidence of filled cores and carbon caps is provided by the cross-sectional TEM image in FIG. 3a and energy-dispersive x-ray (EDX) spectra illustrated in FIG. 3b. The cross-sectional TEM image in FIG. 3a shows that individual conductive filler grows continuously from the bottom to the top of the carbon nanotubes. The filled nature of the carbon nanotubes can be clearly seen by the distinct contrast between the filled core and carbon wall. The cross-sectional TEM image in FIG. 3a reveals that the cores have a large head near the tube tip, in agreement with the SEM image (FIG. 2c). The core diameter in the cross-sectional TEM image in FIG. 3a appears slightly smaller than that observed in the SEM image (FIG. 2c), presumably due to the off-center cut of the TEM specimen. EDX analysis revealed that the walls and caps of the conductive fillers are carbon. A high-resolution TEM image (FIG. 3a) reveals that the carbon walls are disordered graphite.

Figure 3C:
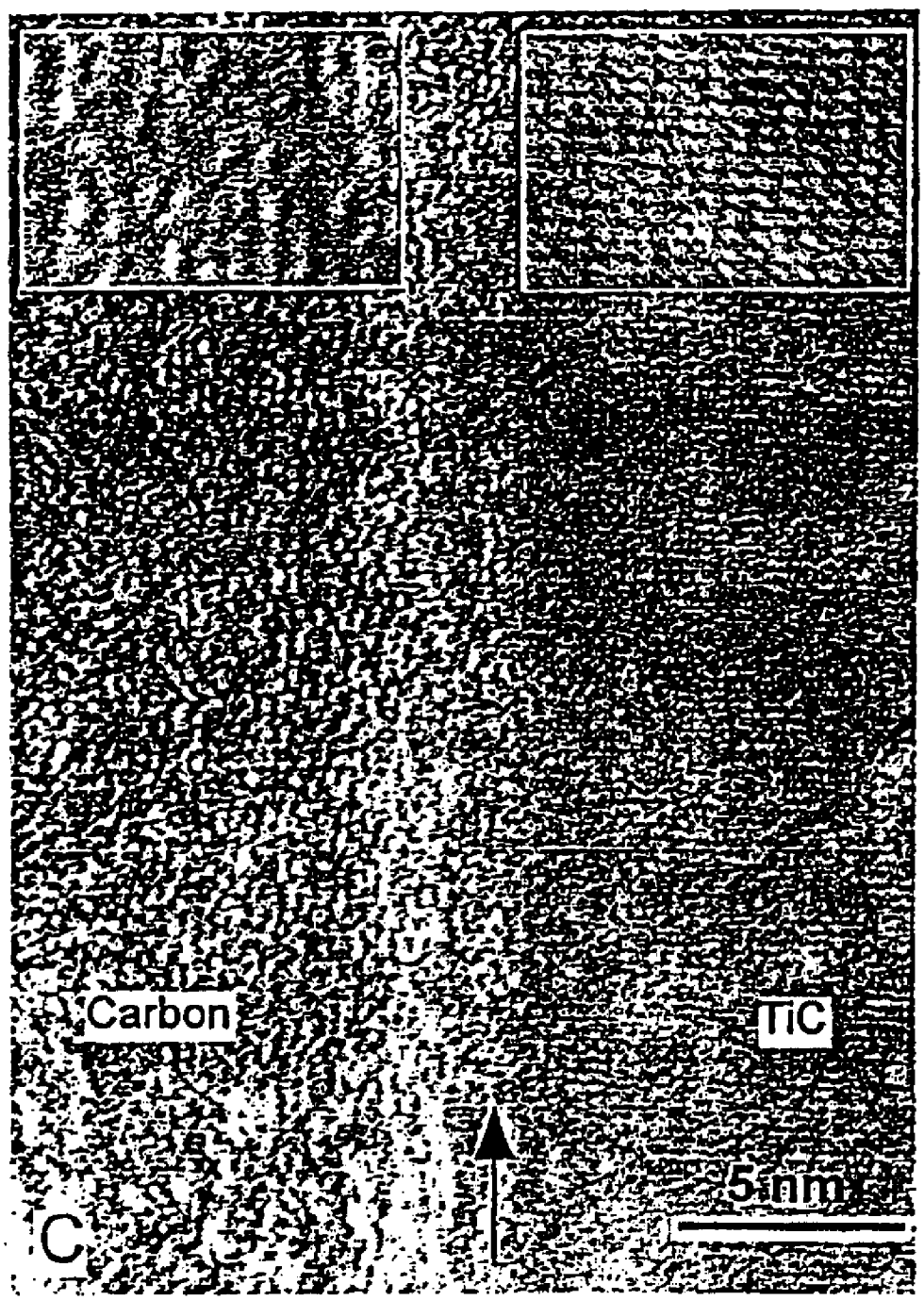
FIG. 3c is a photograph of a high resolution transmission electron microscopy illustrating that the carbon walls are disordered graphite.

EDX analysis of the carbon nanotube and conductive filler of the present invention also indicates that the core of the conductive filler is comprised of titanium and carbon except for the region near the prepared substrate where iron was found. Electron diffraction patterns obtained from the cores reveal that the cores are cubic TiC. The convergent beam electron diffraction pattern (inset in FIG. 3a) recorded along the <001> zone axis parallel to the electron beam exhibits a lattice spacing (~0.43 nm) and four-fold symmetry corresponding to the (100) planes of cubic TiC. In addition, the electron diffraction patterns reveal that the TiC cores are single crystals. In the high-resolution TEM image (FIG. 3c), the interface between the graphite wall and TiC core is abrupt and free of any intermediate phase. The magnified images show well-ordered lattice fringes of the TiC core (right inset of FIG. 3c) and disordered lattice fringes of the graphite wall (left inset of FIG. 3c). It should be pointed out that this is the first time that carbon nanotubes are completely filled with metallic TiC cores.

Moreover, all TiC cores show a big head near the tube tip (FIGS. 2c and 3a), indicating that the initial growth of the TiC cores is faster. This may be due to an initially high concentration of titanium dissolved in the iron particle during heating to the growth temperature (2.7 to 3 hours) before introducing ethylene gas into the reactor. After the initial growth, the dissolution and precipitation process reaches an equilibrium condition under which the consumed rate of titanium for the precipitation of TiC is approximately equal to the mass transfer rate of titanium into the iron particle, resulting in uniform core diameters. Carbon diffusion is not the limiting step in the formation of TiC because interstitial diffusion of carbon in iron is much faster than substitutional diffusion of titanium in iron.

Therefore it can be concluded that growth of oriented and filled carbon nanotubes requires stable catalytic particles and low free energy of formation of a reaction product in the core.

While a preferred embodiment of the present invention has been shown and described, it will be apparent to those skilled in the art that many changes and modifications may be made without departing from the invention in its broader aspects.

The appended claims are therefore intended to cover all such changes and modifications as fall within the true spirit and scope of the invention.

We claim:

1. A method for synthesizing an array of a plurality of carbon nanotubes, each of said carbon nanotubes having a first end attached to a conductive substrate, and a second end extending from said conductive substrate, each of said carbon nanotubes having a closed outer wall defining a core that is hollow, wherein said core is filled more than 10% with a conductive filler, comprising the steps of:
   (a) depositing a growth catalyst onto said conductive substrate forming a prepared substrate;
   (b) creating a vacuum within a vessel containing said prepared substrate;
   (c) flowing H2/Ar gas within said vessel and increasing the pressure within said vessel;
   (d) increasing the temperature of said prepared substrate; and
   (e) changing said H2/Ar gas to ethylene gas such that said ethylene gas flows within said vessel.

2. The method as recited in claim 1, wherein said depositing comprises depositing a layer of said growth catalyst by electron beam evaporation.

3. The method as recited in claim 2, wherein said layer is a thin layer between about 1 to 30 nanometers in thickness.

4. The method as recited in claim 1, wherein said growth catalyst is selected from the group consisting of iron, iron oxide and combinations thereof.

5. The method as recited in claim 1, wherein said vacuum is a pressure at or below 1 torr.

6. The method as recited in claim 1, wherein said vessel is a quartz reactor.

7. The method as recited in claim 1, wherein said pressure is a pressure within the range of pressures between 200 torr and 400 torr.

8. The method as recited in claim 1, wherein said vessel is within a tube furnace for said heating.

9. The method as recited in claim 1, wherein said temperature is a temperature within the range of temperatures between 650° C. and 800° C.

10. The method as recited in claim 1, wherein said conductive substrate is selected from the group consisting of titanium, titanium carbide, vanadium, tantalum, and combinations thereof.

11. The method as recited in claim 1, wherein said conductive filler comprises carbon and an element from the group of elements consisting of titanium, vanadium, tantalum, and combinations thereof.

12. The method as recited in claim 1, wherein said carbon nanotubes are of uniform length such that the length of each of said carbon nanotubes varies no more than 5%.

13. The method as recited in claim 12, wherein said length ranges from 1 to 2 $\mu$m.

14. The method as recited in claim 1, wherein said carbon nanotubes are of uniform diameter such that the diameter of each of said carbon nanotubes varies no more than 5%.

15. The method as recited in claim 14, wherein said diameter is an outside nanotube diameter ranging from 50 to 400 nm and an inside nanotube diameter ranging from 10 to 100 nm.

* * * * *